United States Patent
Fedorova

(10) Patent No.: US 7,689,773 B2
(45) Date of Patent: Mar. 30, 2010

(54) METHODS AND APPARATUS FOR ESTIMATING FAIR CACHE MISS RATES ON A CHIP MULTIPROCESSOR

(75) Inventor: Alexandra Fedorova, Lincoln, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 591 days.

(21) Appl. No.: 11/606,736

(22) Filed: Nov. 30, 2006

(65) Prior Publication Data

US 2008/0134184 A1 Jun. 5, 2008

(51) Int. Cl.
*G06F 12/00* (2006.01)

(52) U.S. Cl. ...................... 711/130; 711/147; 711/150; 711/151; 711/158; 711/E12.023

(58) Field of Classification Search ...................... None
See application file for complete search history.

(56) References Cited

OTHER PUBLICATIONS

A. Fedorova et al., Cache-Fair Thread Scheduling for Multicore Processors, TR-17-06, Harvard University, Oct. 2006.*
* cited by examiner

*Primary Examiner*—Reginald G Bragdon
*Assistant Examiner*—Baboucarr Faal
(74) *Attorney, Agent, or Firm*—Brooks Kushman P.C.

(57) ABSTRACT

A caching estimator process identifies a thread for determining the fair cache miss rate of the thread. The caching estimator process executes the thread concurrently on the chip multiprocessor with a plurality of peer threads to measure the actual cache miss rates of the respective threads while executing concurrently. Additionally, the caching estimator process computes the fair cache miss rate of the thread based on the relationship between the actual miss rate of the thread and the actual miss rates of the plurality of peer threads. As a result, the caching estimator applies the fair cache miss rate of the thread to a scheduling policy of the chip multiprocessor.

20 Claims, 5 Drawing Sheets

METHODS AND APPARATUS FOR ESTIMATING FAIR CACHE MISS RATES ON A CHIP MULTIPROCESSOR

BACKGROUND

Multi-core processors ("chip multiprocessors") contain multiple processing cores that enable multiple application threads to run simultaneously on a single processor device. Such multi-core technology provides improved power efficiency and increased hardware utilization in comparison with conventional single-core processors. Furthermore, during execution, each processing core of the chip multiprocessor shares various resources that are not specifically dedicated to a single processing core. These shared resources include, for example, level 2 (L2) on-board cache devices, memory bus devices, direct memory access (DMA) devices, store buffers and the like. Typically, as in conventional multiprocessor systems, a computer's operating system manages and administers the application threads via a scheduling policy. The scheduling policy, in turn, determines when and for how long the particular application threads will execute on the various processing cores of the chip multiprocessor.

SUMMARY

Conventional scheduling policies were designed and implemented for conventional multiprocessors and, thus, suffer from a variety of deficiencies. To that effect, conventional scheduling policies make assumptions that do not apply on chip multiprocessors. For example, such conventional scheduling policies assume that the central processing unit (CPU), or multiprocessor, is a single, indivisible resource. Conventional scheduling policies further assume that if application threads are granted equal time slices (e.g., execution time on a processing core of the multiprocessor), those threads will share the CPU equally. On chip multiprocessors, however, concurrently running threads, or co-runners, often share a single second-level (L2) cache, whereby cache allocation is controlled by the hardware. Cache sharing depends solely on the cache needs of the co-runner(s), and unfair cache sharing often occurs. A thread's cache occupancy affects its cache miss rate, and, as a result, impacts the rate at which the thread retires instructions. Therefore, a thread's CPU performance significantly varies depending on the characteristics of its co-runner (also referred to as a thread's "co-runner dependent performance variability").

Co-runner dependent performance variability can create a number of problems. One such problem is unfair CPU sharing among co-executing threads. Conventional schedulers ensure that equal-priority threads get equal time shares of the CPU execution. With multiprocessors, a thread's share of the CPU, and thus its forward progress, depends both upon its CPU quantum and the cache behavior of its co-runners. For example, a thread may perform its instructions up to 36% slower with an incompatible co-runner. Another problem attributed to co-runner dependent performance variability is poor priority enforcement. A priority-based scheduler on a conventional processor ensures that elevating a job's (e.g., thread's) priority results in greater forward progress for that job. With a multiprocessor, if the high-priority job is scheduled with 'bad', or incompatible, co-runners, that particular thread will experience inferior performance. Yet another problem caused by co-runner dependent performance variability is inaccurate CPU accounting. On commercial computing systems where users are charged for CPU hours, conventional schedulers ensure that processes are billed proportionally to the amount of computation accomplished by a job. With a chip multiprocessor, however, the amount of computation performed in a CPU hour varies depending on the co-runners. Thus, charging a user for CPU hours on a chip multiprocessor is not necessarily an accurate and proportionate accounting metric.

Accordingly, example configurations described herein substantially overcome the shortcomings presented by providing a cache-fair scheduling policy that significantly improves thread performance efficiency on chip multiprocessors. The cache-fair scheduling policy reduces the effects of unequal CPU cache sharing that occur on chip multiprocessors such as unfair CPU sharing, priority inversion, and inadequate CPU accounting. To achieve fair sharing of CPU resources on conventional multiprocessors, the operating system should consider L2 cache allocation. This problem is similar to fair sharing in a shared-memory multiprocessor, but the solution in the context of chip multiprocessors is quite different. The difference is that the operating system can control multiprocessor memory allocation, while L2 cache allocation is outside the operating system's control. The cache-fair algorithm redistributes CPU time to threads to account for unequal cache sharing. Thus, if a thread's performance decreases due to unequal cache sharing, that particular thread will be allocated more CPU execution time, and vice versa (that is, if a thread's performance increases due to unequal cache sharing, that particular thread will be allocated less CPU execution time). In implementing the cache-fair algorithm, the operating system should determine how a thread's performance is affected by unequal cache sharing using limited information from the hardware. To accomplish this, the cache-fair algorithm uses runtime statistics and analytical models and, as a result, does not require new hardware structures or operating system control over cache allocation. The analytical models disclosed herein are designed for use inside an operating system such that these models impose low runtime overhead and do not require any pre-processing of the workload or any a priori knowledge about the cache locality.

In accordance with embodiments disclosed herein, a caching estimator process identifies a thread for determining the fair cache miss rate of the thread. The caching estimator process executes the thread concurrently on the chip multiprocessor with a plurality of peer threads to measure the actual cache miss rates of the respective threads while executing concurrently. Additionally, the caching estimator process computes the fair cache miss rate of the thread based on the relationship between the actual miss rate of the thread and the actual miss rates of the plurality of peer threads. As a result, the caching estimator applies the fair cache miss rate of the thread to a scheduling policy of the chip multiprocessor. In one example embodiment, the caching estimator process repeats the steps of, i) executing the thread concurrently on the chip multiprocessor with a plurality of peer threads to measure the actual cache miss rates of the respective threads while executing concurrently, and ii) computing the fair cache miss rate of the thread based on the relationship between the actual miss rate of the thread and the actual miss rates of the plurality of peer threads, for a predetermined number of iterations as defined by the scheduling policy.

In another embodiment, the caching estimator process estimates a linear relationship between the actual cache miss rate of the thread and the actual cache miss rates of the plurality of peer threads. In this manner, the estimate(s) provide linear parameters for a gradient value and a constant value. Furthermore, the caching estimator process applies linear regression to model the expected cache miss rate of the thread in relation to the aggregate miss rates of the plurality of peer threads. Still further, the caching estimator process determines the fair cache miss rate of the thread based on the relationship between the number of peer threads that were executed concurrently, the gradient value and the constant value. The caching estimator process also executes the thread concurrently on the chip multiprocessor with a plurality of peer threads to measure the actual level 2 (L2) cache miss rates of the respective threads while executing concurrently in accordance with one example embodiment. In addition, the caching estimator process concurrently executes a peer thread for each available processing core of the chip multiprocessor.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems Inc. of Palo Alto, Calif., USA.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In accordance with embodiments described herein, the fair L2 cache miss rate is defined as the number of misses per cycle (MPC) that would be generated by a thread if the cache were shared equally. The estimation of a thread's fair cache miss rate is necessary in order to estimate its fair cycles per instruction (CPI). Modeling cache miss rates is a well-studied area, but existing models require inputs that are expensive to obtain at runtime. As such, the methods disclosed herein are not a general-purpose cache model, but instead produce accurate estimates with low runtime overhead. Furthermore, the analytical models disclosed herein are based on an empirically derived observation that if the co-running threads have similar cache miss rates, each of the co-running threads will also have an approximately equal share of the cache.

For example, if thread co-runners A and B experience similar miss rates, these threads also share the cache equally and both experience their fair miss rate. In this case, co-running threads A and B are deemed to be "cache-friendly" co-runners. To estimate the fair cache miss rate, for example, for Thread A on a dual-core CPU, a caching estimator process 150-2 may execute Thread A with different co-runner threads until a cache-friendly co-runner thread is found. This methodology is not practical, however, because a cache-friendly co-runner may not exist. Even so, if a cache-friendly thread does exist, the processing required to find such a cache-friendly thread may involve $O(n^2)$ tests.

Instead, in accordance with example embodiments, the caching estimator process 150-2 executes a thread with several different co-runners (or groups of co-runners) and derives the relationship between a specific thread's miss rate and the miss rates of the thread's co-runner threads. As a result, the caching estimator process 150-2 utilizes this relationship to estimate the miss rate Thread A would experience with a "hypothetical" cache-friendly co-runner (e.g., Thread A's fair miss rate).

Figure 1:
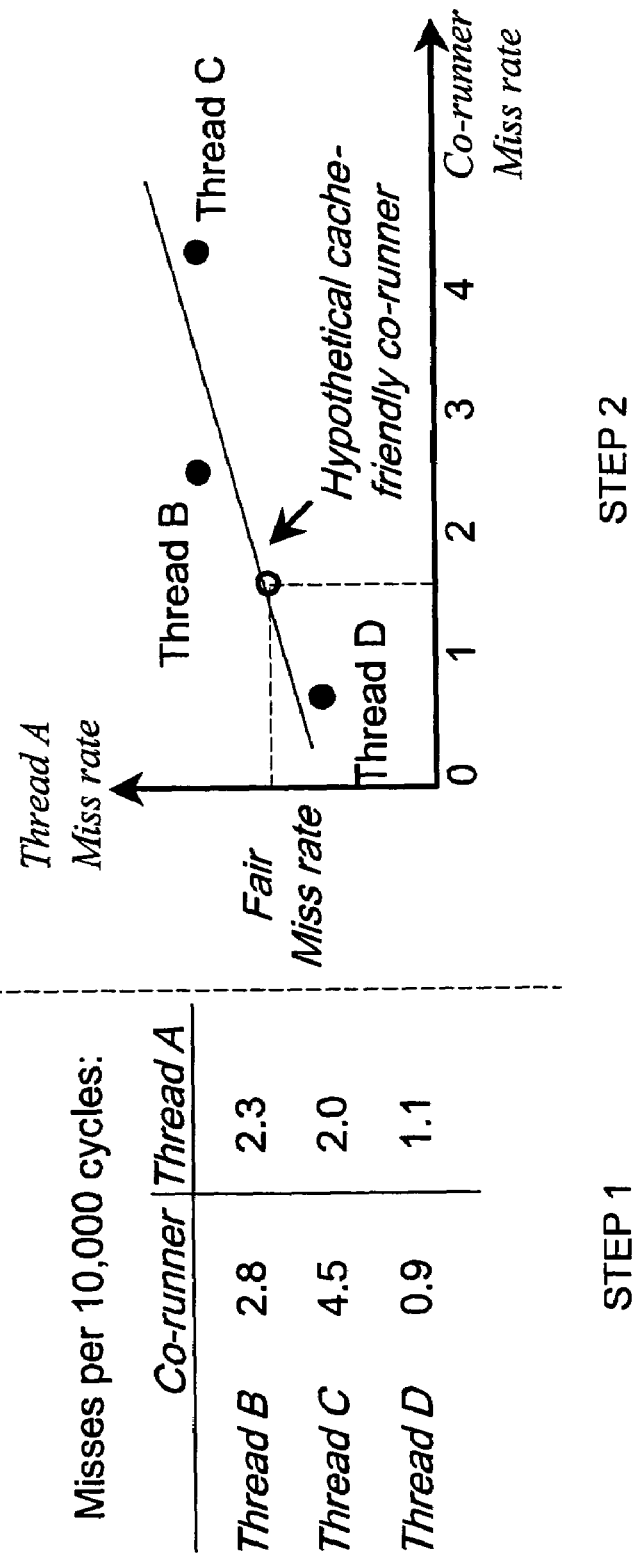
FIG. 1 is a diagram of a two step process for estimating the cache miss rates of co-executing threads on a chip multiprocessor in accordance with one example embodiment.

FIG. 1 illustrates an example embodiment of a two step process for estimating the fair cache miss rate of Thread A in comparison to Thread A's co-runner threads (e.g., Threads B, C and D). Accordingly, Step 1 shows the miss rates measured as Thread A runs with the co-runners threads Thread B, Thread C and Thread D. In addition, Step 2 shows the caching estimator process 150-2 deriving a linear relationship between the miss rate of Thread A and its co-runners, Threads B, C and D. The caching estimator process 150-2 then uses the corresponding linear equation to compute Thread A's miss rate when running with a hypothetical cache-friendly co-runner (e.g., computes Thread A's fair miss rate). The methodology depicted in FIG. 1 relies on two assumptions, i) cache-friendly co-runner threads have similar cache miss rates, and ii) the relationship between co-runners threads' miss rates is linear. Details of the caching estimator process 150-2 are discussed below.

Figure 2:
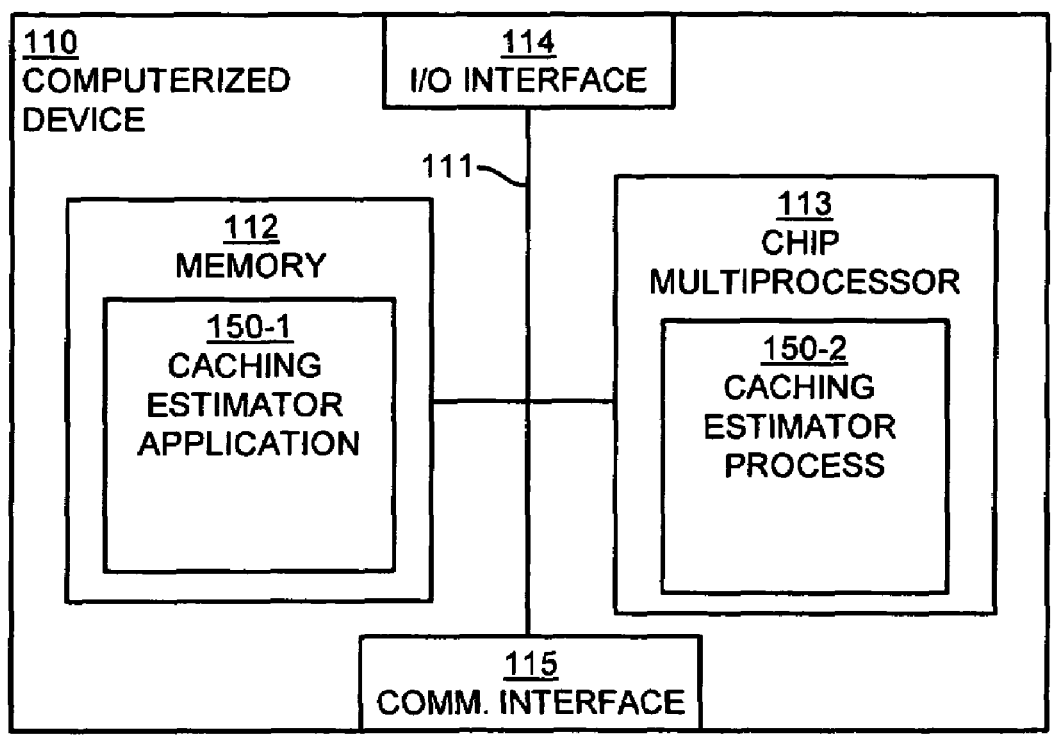
FIG. 2 is a block diagram of a computerized system configured with an application including a caching estimator process in accordance with one example configuration.

FIG. 2 is a block diagram illustrating example architecture of a computer system 110 that executes, runs, interprets, operates or otherwise performs a caching estimator application 150-1 and process 150-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a chip multiprocessor 113 (e.g., having a plurality of processing cores), an input/output interface 114, and a communications interface 115. An input device 116 (e.g., one or more user/developer controlled devices such as a pointing device, keyboard, mouse, etc.) couples to chip multiprocessor 113 through I/O interface 114, and enables a user 108 to provide input commands and generally control the graphical user interface 171 that the caching estimator application 150-1 and process 150-2 provides on the display 130. The communications interface 115 enables the computer system 110 to communicate with other devices (i.e., other computers) on a network (not shown). This can allow access to the caching estimator 150-1 application by remote computer systems.

The memory system 112 is any type of computer readable medium and in this example is encoded with a caching estimator application 150-1. The caching estimator application 150-1 may be embodied as software code such as data and/or logic instructions (e.g., code stored in the memory or on another computer readable medium such as a removable disk) that supports processing functionality according to different embodiments described herein. During operation of the computer system 110, the chip multiprocessor 113 accesses the memory system 112 via the interconnect 111 in order to launch, run, execute, interpret or otherwise perform the logic instructions of the caching estimator application 150-1. Execution of the caching estimator application 150-1 (e.g., on at least one processing core of the chip multiprocessor 113) in this manner produces processing functionality in a caching estimator process 150-2. In other words, the caching estimator process 150-2 represents one or more portions of runtime instances of the caching estimator application 150-1 (or the entire application 150-1) performing or executing within or upon the chip multiprocessor 113 in the computerized device 110 at runtime.

Figure 3:
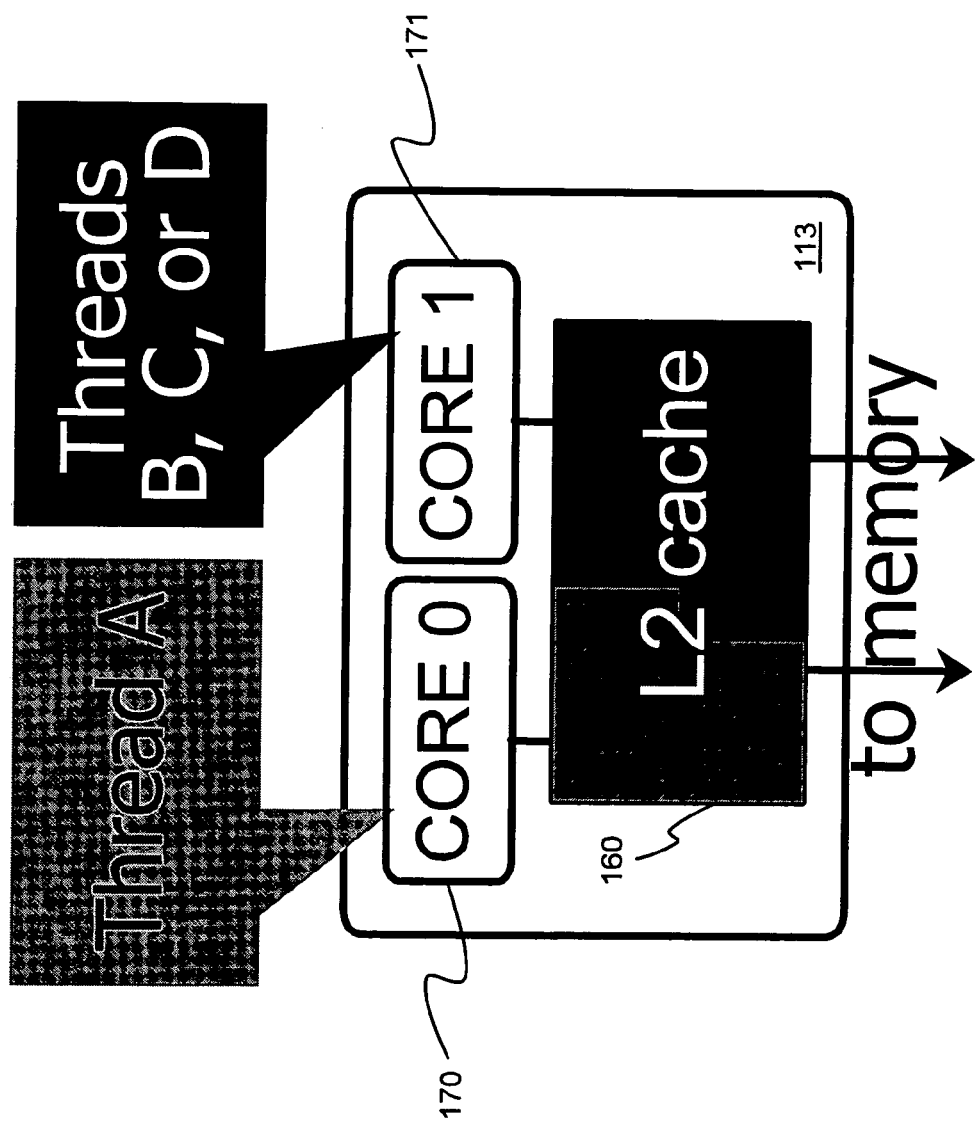
FIG. 3 is a block diagram of a dual-core chip multiprocessor system having various co-executing threads running on the processing cores in accordance with one example configuration.

FIG. 3 depicts an example configuration of a dual-core chip multiprocessor 113 having a first processing core (core-0) 170 and second processing core (core-1) 171. In this example, Thread A executes on processing core (core-0) 170 and one from the group of co-runner threads Thread B, Thread C and Thread D, executes on processing core (core-1) 171. Furthermore, processing cores 170 and 171 share L2 cache 160 located on chip multiprocessor 113. Assume for this example embodiment that the thread scheduling process 150-2 identifies Thread A for determining Thread A's fair cache miss rate.

Figure 4:
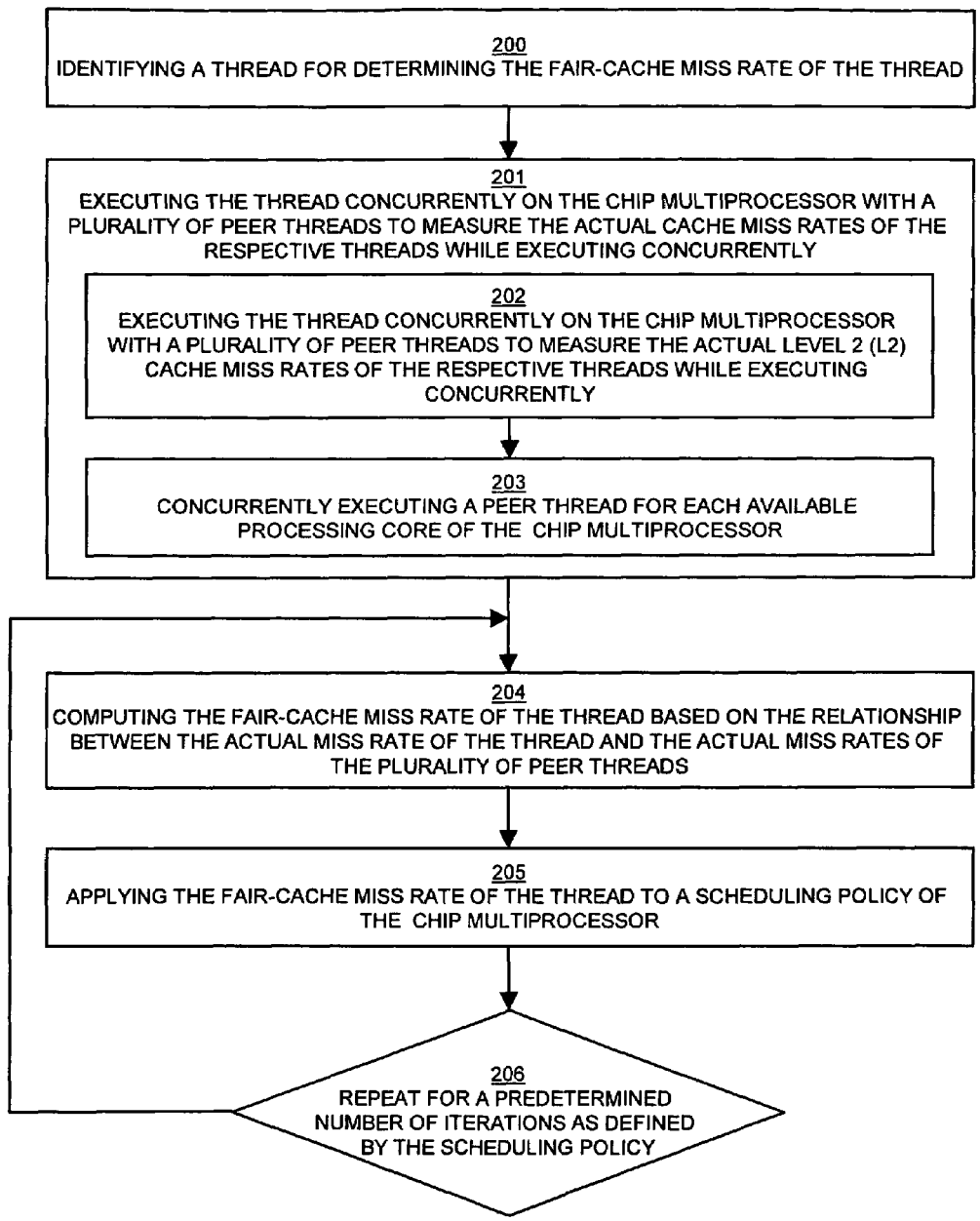
FIG. 4 is a flow chart of processing steps that shows high-level processing operations performed by the caching estimator process when it estimates the fair cache miss rate of a thread in accordance with one example configuration.
Figure 5:
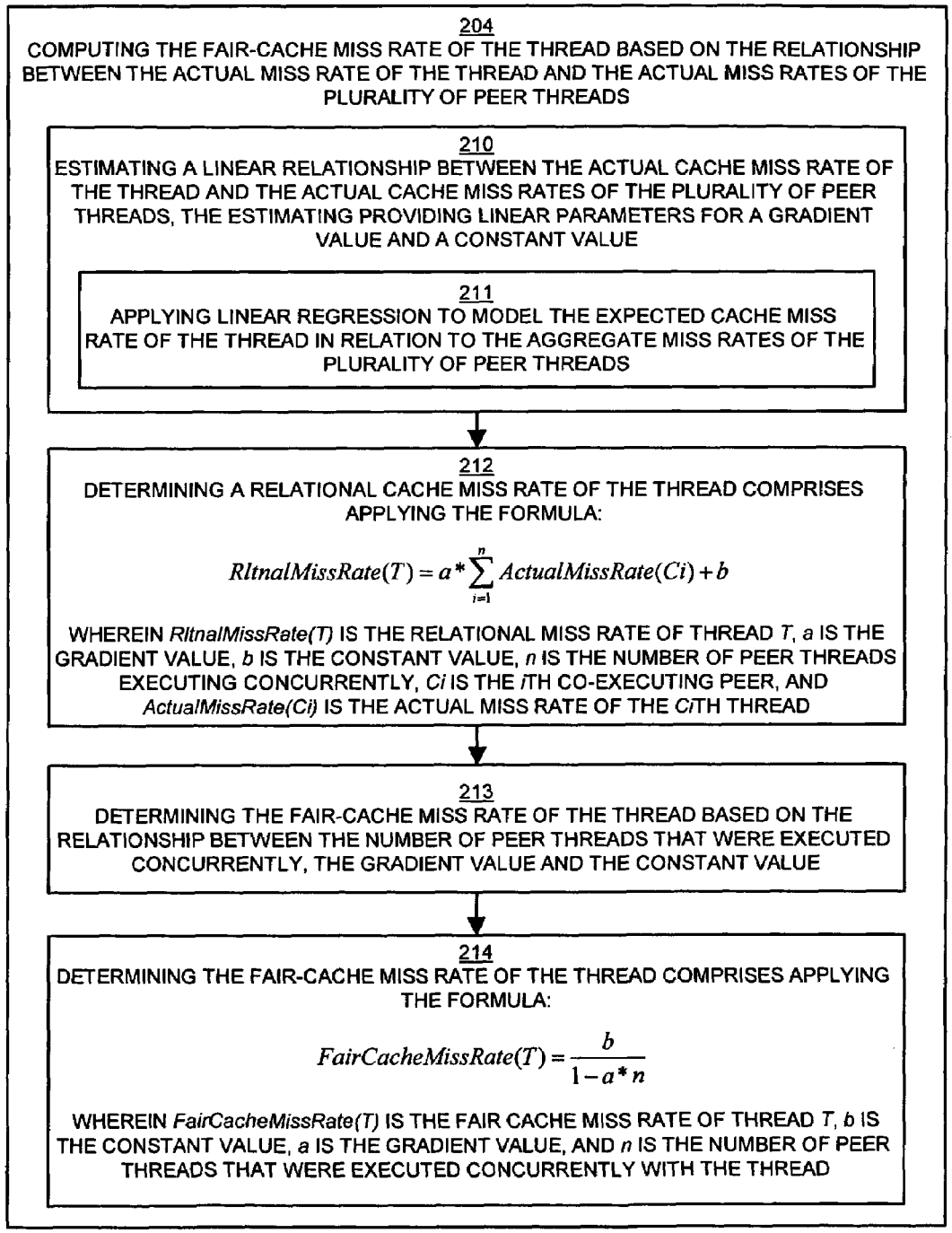
FIG. 5 is a flow chart of processing steps that shows high-level processing operations performed by the caching estimator process when it estimates the fair cache miss rate of a thread in accordance with one example configuration.

Flow charts of the example embodiments presently disclosed methods are depicted in FIGS. 4 and 5. The rectangular elements are herein denoted "steps" and represent computer software instructions or groups of instructions. Alternatively, the steps are performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

FIG. 4 is a flow chart of processing steps that shows high-level processing operations performed by the caching estimator process 150-2 when it estimates the fair cache miss rate of a thread in accordance with one example configuration.

In step 200, the caching estimator process 150-2 identifies a thread for determining the fair cache miss rate of the thread. The caching estimator process 150-2 may select any available thread in the computing system for determining the fair cache miss rate of that thread.

In step 201, the caching estimator process 150-2 executes the thread concurrently on the chip multiprocessor 113 with a plurality of peer threads to measure the actual cache miss rates of the respective threads while executing concurrently. As shown in the example configuration of FIG. 3, the caching estimator process 150-2 executes Thread A on processing core (core-0) 170 concurrently with one from the group of co-runner Thread B, Thread C or Thread D on processing core (core-1) 171. It should be noted that the identified thread (e.g., Thread A) and the co-runner threads (e.g., Threads B, C and D) may execute on any processing core in a chip multiprocessor and the determination of the fair cache miss rate is not limited to configuration of the processing cores depicted in the example embodiment of FIG. 3.

In step 202, the caching estimator process 150-2 executes the thread concurrently on the chip multiprocessor 113 with a plurality of peer threads to measure the actual level 2 (L2) cache miss rates of the respective threads while executing concurrently. For example, the caching estimator process 150-2 executes Thread A on processing core (core-0) 170 concurrently with one from the group of co-runner threads Thread B, C or D on processing core (core-1) 171 to measure the actual L2 cache miss rates, as shown in FIG. 3.

In step 203, the caching estimator process 150-2 concurrently executes a peer thread for each available processing core of the chip multiprocessor 113. For example, in a quad-core chip multiprocessor (e.g., a central processing unit "CPU" having four processing cores), the caching estimator process 150-2 would execute the identified thread (e.g., Thread A) on one processing core while concurrently executing the co-runner threads (e.g., Threads B, C and D) on the three available processing cores that remain in the chip multiprocessor 113.

In step 204, the caching estimator process 150-2 computes the fair cache miss rate of the thread based on the relationship between the actual miss rate of the thread and the actual miss rates of the plurality of peer threads. Details of such processing are discussed in the steps below.

In step 205, the caching estimator process 150-2 applies the fair cache miss rate of the thread to a scheduling policy of the chip multiprocessor 113. In other words, an operating system may utilize the fair cache miss rate in administering a scheduling policy for the chip multiprocessor 113 to improve thread performance. The methods for applying the fair cache miss rate of the thread to a scheduling policy are augmented by techniques discussed in copending patent application Ser. No. 11/606,751, entitled "METHODS AND APPARATUS FOR SCHEDULING APPLICATIONS ON A CHIP MULTIPROCESSOR", filed concurrently, incorporated herein by reference.

In step 206, the caching estimator process 150-2 repeats steps 201 and 204 for a predetermined number of iterations as defined by the scheduling policy. According to one example embodiment, the number of iterations to compute the fair cache miss rate for one thread depends on how many points are desired for the linear regression analysis.

FIG. 5 is a flow chart of processing steps that shows high-level processing operations performed by the caching estimator process 150-2 when it estimates the fair cache miss rate of a thread in accordance with one example configuration.

In step 210, the caching estimator process 150-2 estimates a linear relationship between the actual cache miss rate of the thread and the actual cache miss rates of the plurality of peer threads. In this manner, the estimation provides linear parameters for a gradient value and a constant value. For example, Step 2 in FIG. 1 shows a graphical representation of a linear relationship between the actual miss rate of Thread A and the actual miss rates of co-runner threads Thread B, C and D.

In step 211, the caching estimator process 150-2 applies linear regression to model the expected cache miss rate of the thread in relation to the aggregate miss rates of the plurality of peer threads. Linear regression is a mathematical method that estimates an expected value cache miss rate value for the identified thread (e.g., Thread A) in relation to the cache miss rates of the co-runner threads (e.g., Threads B, C and D). Generally, linear regression will produce a gradient value, or slope, and a constant value operable for deriving a linear model of the identified thread's cache miss rate.

In step 212, the caching estimator process 150-2 determines a relational cache miss rate of the thread comprises applying the formula:

$$RltnalMissRate(T) = a * \sum_{i=1}^{n} ActualMissRate(Ci) + b$$

wherein RltnalMissRate(T) is the relational cache miss rate of thread T, a is the gradient value, b is the constant value, n is the number of peer, or co-runner, threads executing concurrently, Ci is the ith co-executing peer thread, and ActualMissRate(Ci) is the actual miss rate of the Cith co-executing peer thread. The relational cache miss rate (RltnalMissRate) uses linear regression modeling in calculating the linear parameters (e.g., gradient value a and constant value b).

In step 213, the caching estimator process 150-2 determines the fair cache miss rate of the thread based on the relationship between the number of peer threads that were executed concurrently, the gradient value and the constant value. Since under fair cache sharing the miss rate of the thread and its co-runners are equal, the relationship between the quantities in the formula of Step 212 can be expressed as:

FairCacheMissRate=RltnalMissRate=ActualMissRate

Thus, the FairCacheMissRate can be substituted into the left and right sides of the equation for Step 212, and enables the derivation of the equation in Step 14, discussed below.

In step 214, the caching estimator process 150-2 determines the fair cache miss rate of the thread comprises applying the formula:

$$FairCacheMissRate(T) = \frac{b}{1 - a*n}$$

wherein FairCacheMissRate(T) is the fair cache miss rate of thread T, b is the constant value, a is the gradient value, and n is the number of peer, or co-runner, threads that were executed concurrently with the thread. For instance, the number of peer threads n is three (e.g., n=3) in the example chip multiprocessor configuration shown in FIG. 1 since co-runner threads Thread B, C and D were each executed concurrently with Thread A at one point. In an alternate embodiment, the variable n is representative of a chip multiprocessor having 'n+1' processing cores.

Those skilled in the art should readily appreciate that the programs and methods for estimating fair cache miss rates on a chip multiprocessor as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for estimating fair cache miss rates on a chip multiprocessor has been particularly shown and described with references to embodiments thereof, it will be understood by those skilled in the art that various changes in form and details may be made therein without departing from the scope of the invention encompassed by the appended claims.

What I claim is:

1. A method for estimating the fair cache miss rate of a thread executing on a chip multiprocessor having a plurality of processing cores, the method comprising:
   identifying a thread for determining the fair cache miss rate of the thread;
   executing the thread concurrently on the chip multiprocessor with a plurality of peer threads to measure the actual cache miss rates of the respective threads while executing concurrently;
   computing the fair cache miss rate of the thread based on the relationship between the actual miss rate of the thread and the actual miss rates of the plurality of peer threads; and
   applying the fair cache miss rate of the thread to a scheduling policy of the chip multiprocessor.

2. The method of claim 1 further comprising:
   for a predetermined number of iterations as defined by the scheduling policy, repeating the steps of:
   executing the thread concurrently on the chip multiprocessor with a plurality of peer threads to measure the actual cache miss rates of the respective threads while executing concurrently; and
   computing the fair cache miss rate of the thread based on the relationship between the actual miss rate of the thread and the actual miss rates of the plurality of peer threads.

3. The method of claim 1 wherein the computing the fair cache miss rate of the thread comprises:
estimating a linear relationship between the actual cache miss rate of the thread and the actual cache miss rates of the plurality of peer threads, wherein estimating the linear relationship provides linear parameters for a gradient value and a constant value.

4. The method of claim 3 wherein estimating a linear relationship between the actual cache miss rate of the thread and the actual cache miss rates of the plurality of peer threads comprises:
applying linear regression to model the expected cache miss rate of the thread in relation to the aggregate miss rates of the plurality of peer threads.

5. The method of claim 3 further comprising:
determining a relational cache miss rate of the thread comprises applying the formula:

$$RltnalMissRate(T) = a * \sum_{i=1}^{n} AcutalMissRate(Ci) + b$$

wherein RltnalMissRate(T) is the relational cache miss rate of thread T, a is the gradient value, b is the constant value, n is the number of peer threads executing concurrently, Ci is the ith co-executing peer thread, and ActualMissRate(Ci) is the actual miss rate of the Cith co-executing peer thread.

6. The method of claim 5 wherein the computing the fair cache miss rate of the thread comprises:
determining the fair cache miss rate of the thread based on the relationship between the number of peer threads that were executed concurrently, the gradient value and the constant value.

7. The method of claim 5 further comprising:
determining the fair cache miss rate of the thread comprises applying the formula:

$$FairCacheMissRate(T) = \frac{b}{1 - a * n}$$

wherein FairCacheMissRate(T) is the fair cache miss rate of thread T, b is the constant value, a is the gradient value, and n is the number of peer threads that were executed concurrently with the thread.

8. The method of claim 1 wherein executing the thread concurrently on the chip multiprocessor with a plurality of peer threads comprises:
executing the thread concurrently on the chip multiprocessor with a plurality of peer threads to measure the actual level 2 (L2) cache miss rates of the respective threads while executing concurrently.

9. The method of claim 1 wherein executing the thread concurrently on the chip multiprocessor with a plurality of peer threads comprises:
concurrently executing a peer thread for each available processing core of the chip multiprocessor.

10. A computerized device comprising:
a memory;
a chip multiprocessor;
a communications interface;
an interconnection mechanism coupling the memory, the chip multiprocessor and the communications interface; and wherein the memory is encoded with a caching estimator application that when executed on the chip multiprocessor provides a caching estimator process causing the computerized device to be capable of performing the operations of:
identifying a thread for determining the fair cache miss rate of the thread;
executing the thread concurrently on the chip multiprocessor with a plurality of peer threads to measure the actual cache miss rates of the respective threads while executing concurrently;
computing the fair cache miss rate of the thread based on the relationship between the actual miss rate of the thread and the actual miss rates of the plurality of peer threads; and
applying the fair cache miss rate of the thread to a scheduling policy of the chip multiprocessor.

11. The computerized device of claim 10 further comprising:
for a predetermined number of iterations as defined by the scheduling policy, repeating the steps of:
executing the thread concurrently on the chip multiprocessor with a plurality of peer threads to measure the actual cache miss rates of the respective threads while executing concurrently; and
computing the fair cache miss rate of the thread based on the relationship between the actual miss rate of the thread and the actual miss rates of the plurality of peer threads.

12. The computerized device of claim 10 wherein computing the fair cache miss rate of the thread comprises:
estimating a linear relationship between the actual cache miss rate of the thread and the actual cache miss rates of the plurality of peer threads, wherein estimating the linear relationship provides linear parameters for a gradient value and a constant value.

13. The computerized device of claim 12 wherein estimating a linear relationship between the actual cache miss rate of the thread and the actual cache miss rates of the plurality of peer threads comprises:
applying linear regression to model the expected cache miss rate of the thread in relation to the aggregate miss rates of the plurality of peer threads.

14. The computerized device of claim 12 further comprising:
determining a relational cache miss rate of the thread comprises applying the formula:

$$RltnalMissRate(T) = a * \sum_{i=1}^{n} ActualMissRate(Ci) + b$$

wherein RltnalMissRate(T) is the relational cache miss rate of thread T, a is the gradient value, b is the constant value, n is the number of peer threads executing concurrently, Ci is the ith co-executing peer thread, and ActualMissRate (Ci) is the actual miss rate of the Cith co-executing peer thread.

15. The computerized device of claim 14 wherein the computing the fair cache miss rate of the thread comprises:
determining the fair cache miss rate of the thread based on the relationship between the number of peer threads that were executed concurrently, the gradient value and the constant value.

16. The computerized device of claim 14 further comprising:

determining the fair cache miss rate of the thread comprises applying the formula:

$$FairCacheMissRate(T) = \frac{b}{1-a*n}$$

wherein FairCacheMissRate(T) is the fair cache miss rate of thread T, b is the constant value, a is the gradient value, and n is the number of peer threads that were executed concurrently with the thread.

17. The computerized device of claim 10 wherein executing the thread concurrently on the chip multiprocessor with a plurality of peer threads comprises:
executing the thread concurrently on the chip multiprocessor with a plurality of peer threads to measure the actual level 2 (L2) cache miss rates of the respective threads while executing concurrently.

18. The computerized device of claim 10 wherein executing the thread concurrently on the chip multiprocessor with a plurality of peer threads comprises:
concurrently executing a peer thread for each available processing core of the chip multiprocessor.

19. A computer program product having a computer readable medium operable to store computer program logic embodied in computer program code encoded thereon as an encoded set of chip multiprocessor based instructions for performing cache miss rate estimation comprising:
computer program code for identifying a thread for determining the fair cache miss rate of the thread;
computer program code for executing the thread concurrently on the chip multiprocessor with a plurality of peer threads to measure the actual cache miss rates of the respective threads while executing concurrently;
computer program code for computing the fair cache miss rate of the thread based on the relationship between the actual miss rate of the thread and the actual miss rates of the plurality of peer threads;
computer program code for estimating a linear relationship between the actual cache miss rate of the thread and the actual cache miss rates of the plurality of peer threads, wherein estimating the linear relationship provides linear parameters for a gradient value and a constant value; and
computer program code for applying the fair cache miss rate of the thread to a scheduling policy of the chip multiprocessor.

20. A computerized device comprising:
a memory;
a chip multiprocessor;
a communications interface;
an interconnection mechanism coupling the memory, the chip multiprocessor and the communications interface; and
wherein the memory is encoded with caching estimator application that when executed on the chip multiprocessor provides a means for estimating cache miss rates on the chip multiprocessor comprising:
means for identifying a thread for determining the fair cache miss rate of the thread;
means for executing the thread concurrently on the chip multiprocessor with a plurality of peer threads to measure the actual cache miss rates of the respective threads while executing concurrently;
means for computing the fair cache miss rate of the thread based on the relationship between the actual miss rate of the thread and the actual miss rates of the plurality of peer threads;
means for estimating a linear relationship between the actual cache miss rate of the thread and the actual cache miss rates of the plurality of peer threads, wherein estimating the linear relationship provides linear parameters for a gradient value and a constant value; and
means for applying the fair cache miss rate of the thread to a scheduling policy of the chip multiprocessor.

* * * * *